United States Patent [19]

Wagman

[11] Patent Number: 5,030,668

[45] Date of Patent: Jul. 9, 1991

[54] STABILIZED GLASS REINFORCED POLYACETAL COMPOSITIONS

[75] Inventor: Mark E. Wagman, Wilmington, Del.

[73] Assignee: E. I. Du Pont de Nemours and Company, Wilmington, Del.

[21] Appl. No.: 23,064

[22] Filed: Mar. 6, 1987

[51] Int. Cl.$^5$ ............................ C08K 9/04; C08K 9/06
[52] U.S. Cl. ..................................... 523/209; 523/205; 523/217; 523/466; 524/542
[58] Field of Search ............................. 523/209, 466

[56] References Cited

U.S. PATENT DOCUMENTS 3,210,318 10/1965 Dolce et al. ...................... 260/45.8
3,213,158 10/1965 Sakakibara et al. ................ 260/830

FOREIGN PATENT DOCUMENTS 49-99739 9/1974 Japan .
50-48051 4/1975 Japan .
60-44543 3/1985 Japan .
221343 11/1985 Japan .

Primary Examiner—Melvyn I. Marquis
Assistant Examiner—David W. Woodward

[57] ABSTRACT

Incorporation of 0.02–1.0 weight percent of epoxy containing compounds into glass reinforced polyacetal molding compositions resulting in improved anaerobic thermal stability of such compositions during processing.

13 Claims, No Drawings

STABILIZED GLASS REINFORCED POLYACETAL COMPOSITIONS

DESCRIPTION

1. Technical Field

This invention relates to certain glass filled polyacetal compositions which are characterized by improved thermal stability during processing. Polyacetal compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyacetals of relatively high number average molecular weight, i.e. 10,000 to 100,000, are useful in preparing semi-finished and finished articles by any of the techniques commonly used with thermoplastic materials, e.g. compression molding, injection molding, extrusion, blow molding, rotational molding, melt spinning, stamping and thermoforming. Finished articles made from such compositions possess desirable physical properties, including high stiffness, strength, low coefficient of friction and good solvent resistance. Recent advances in glass fiber technology have resulted in improved compatibility between the glass fiber and the polyacetal, giving polyacetal compositions which are reinforced with the glass, i.e., the polyacetal composition is characterized by improved strength as well as improved stiffness, as compared with polyacetals that are merely stiffened by filling with glass or contain no glass. However, the inclusion of glass fibers, especially the recently developed more compatible glass fibers, in polyacetal compositions has resulted in unacceptable deterioration of the anaerobic thermal stability of the polyacetal compositions during processing, as measured by standard thermally evolved formaldehyde (TEF) procedures.

2. Background Art

U.S. Pat. No. 3,210,318, granted Oct. 5, 1965 to Dolce et al., discloses oxymethylene polymers stabilized with epoxides. However, the oxymethylene polymer compositions disclosed by Dolce do not contain glass, and the stability improvements disclosed relate to improved resistance to discoloration and weight loss upon exposure to air at 230° C.

U.S. Pat. No. 3,213,158, granted Oct. 19, 1965 to Sakakibara et al., discloses polyoxymethylene compositions stabilized with partially cured epoxy resins. In addition, the polyoxymethylene compositions disclosed by Sakakibara do not contain glass.

Japanese Patent Publication Number 74/99,739, published Sept. 20, 1974, discloses a polyacetal resin composition containing methyl red-acidic inorganic fillers stabilized with a diepoxide compound, among other things. Conventional glass fiber is not a methyl red-acidic inorganic filler.

Japanese Patent Publication Number 75/48,051, published Apr. 28, 1975, discloses polyoxymethylene compositions containing epichlorohydrin polymers and epoxy compounds, among other things, which compositions are disclosed as having good heat stability. However, these polyoxymethylene compositions do not contain glass, and the stability measurements disclosed are made by measuring weight loss upon exposure to air at 230° C.

Japanese Patent Publication Number 85/44,543, published Mar. 9, 1985, discloses acetal resin compositions containing aliphatic or aromatic polyol polyglycidyl ethers or diglycidyl aromatic dicarboxylates, among other things, including inorganic filler. Improved interfacial adhesion is disclosed. No specific mention is made of glass fiber, and while there is mentioned that thermal stability is not degraded, no test for thermal stability is described.

Japanese Patent Publication Number 85/221,343, published Nov. 6, 1985, discloses a sizing composition for glass fibers that contains a tetrafunctional epoxy resin emulsion. Glass fibers with this sizing are intended for reinforcing thermoplastic resins, especially polyacetal resins.

DISCLOSURE OF THE INVENTION

This invention relates to certain glass reinforced polyacetal compositions which are characterized by improved thermal stability during processing, as measured by standard thermally evolved formaldehyde (TEF) procedures. The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

There have recently been developed glass fibers having improved compatibility with acetal polymers, thus permitting reinforcement of polyacetal compositions with such glass fibers, resulting in polyacetal compositions having improved strength and stiffness compared with polyacetals that are merely glass filled or contain no glass. However, it has been found that when glass, especially the recently developed more compatible glass fibers, are blended into polyacetal compositions, there has resulted the unacceptable deterioration of the anaerobic thermal stability of the polyacetal compositions during processing, as determined by standard procedures for measuring thermally evolved formaldehyde.

It has now been found that glass filled polyacetals can be formulated into compositions having improved thermal stability during processing. More specifically, when glass reinforced polyacetals are melt compounded with certain epoxy containing compounds, the resulting compositions are characterized by improved stability as measured by lower evolution of formaldehyde.

The polyacetals used in the compositions of the present invention can be branched or linear and will generally have a number average molecular weight in the range of 10,000 to 100,000, preferably 20,000 to 70,000. The molecular weight can conveniently be measured by gel permeation chromatography in m-cresol at 160° C. using a DuPont PSM bimodal column kit with nominal pore size of 60 and 1000Å. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness. Preferred polyacetal homopolymers include those whose terminal hydroxyl groups have been end-capped by a chemical reaction to form ester or ether groups, preferably acetate or methoxy groups, respectively.

The epoxy containing compound used in the compositions of the present invention is preferably one with a relatively low epoxy equivalent weight. Preferred epoxy containing compounds will have an epoxy equivalent weight of about 100-1000, more preferred 150-500. The epoxy equivalent weight is the molecular weight of the epoxy containing compound per equivalent of epoxy. The epoxy group is believed to be the active moiety in enhancing the thermal stability of the polyacetal during processing; thus, if one uses an epoxy containing compound having a high equivalent weight, then in order to achieve the desired stability enhancement, it will be necessary to use a large quantity of the epoxy containing compound and this could cause deterioration of the physical properties of the composition.

Specific preferred epoxy containing compounds include epoxy phenol novolac resins; 7-oxabicyclo[4.1.0-]heptane-3-carboxylic acid, 7-oxabicyclo[4.1.0]hept-3-ylmethyl ester, polymer with hexahydro-1,3-isobenzofurandione; epoxy cresol novolac resins; diglycidyl ethers of bisphenol A; 3,4-epoxycyclohexylmethyl-3,4-epoxycyclohexane carboxylate; and diglycidyl ethers of poly(oxypropylene)glycol. More preferred epoxy containing compounds include epoxy phenol novolac resins, epoxy cresol novolac resins, and 7-oxabicyclo[4.1.0-]heptane-3-carboxylic acid, 7-oxabicyclo[4.1.0]hept-3-ylmethyl ester, polymer with hexahydro-1,3-isobenzofurandione. The most preferred epoxy containing compounds are epoxy phenol novolac resins.

To achieve the improvement mentioned above, i.e., lower evolution of formaldehyde, the epoxy containing compound will be present in the compositions of the present invention in the amount of 0.02 to 1.0 weight percent based on the amount of polyacetal, glass and epoxy compound, preferably 0.05-0.2 weight percent. This preferred range enables an optimum balance of stability and tensile strength.

The glass used in the compositions of the present invention include chopped strand glass fiber containing a coating comprising a polyurethane or a blend of polyurethanes which consist of the reaction products of 1,6 hexane diisocyanate, 1,4-butanediol, poly(butylene adipate) and poly(ethylene glycol). The coating can also contain minor amounts of aliphatic hydrocarbons, silanes and ethylene glycol diglycidyl ether.

The glass will be present in the compositions of the present invention in the amount of 5 to 50 weight percent based on the amount of polyacetal, glass and epoxy compound, preferably 15-40 weight percent.

It should be understood that the compositions of the present invention can include, in addition to the polyacetal, the glass and the epoxy containing compound, other ingredients, modifiers and additives as are generally used in polyacetal molding resins, including co-stabilizers (such as those disclosed in U.S. Pat. Nos. 3,960,984 and 4,098,843), anti-oxidants, pigments, colorants, processing aids, toughening agents, and other reinforcing agents and fillers.

The compositions of the present invention can be prepared by mixing the epoxy containing stabilizer, the glass and the polyacetal polymer at a temperature above the melting points of the polyacetal using any intensive mixing device conventionally used in preparing thermoplastic polyacetal compositions, such as rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedos and/or various devices to increase internal pressure and/or the intensity of mixing, such as valves, gates or screws designed for this purpose. Extruders are preferred. Of course, such mixing should be conducted at a temperature below which significant degradation of the components of the composition will occur.

Shaped articles can be made from the compositions of the present invention using any of several common methods, including compression molding, injection molding, extrusion, blow molding, rotational molding, melt spinning and thermoforming. Injection molding is preferred. Examples of shaped articles include sheet, profiles, rod stock, filaments, fibers, strapping, tape tubing and pipe. Such shaped articles can be post treated by orientation, stretching, coating, annealing, painting, laminating and plating. Such shaped articles and scrap therefrom can be ground and remolded.

Processing conditions used in the preparation of the compositions of the present invention and shaped articles made therefrom include melt temperatures of about 170°-260° C., preferably 185°-240° C., most preferably 200°-230° C. Generally, the mold temperature will be 10°-120° C., preferably 10°-100° C., and most preferably about 50°-90° C.

In the following examples, there are shown specific embodiments of the present invention and certain comparisons with control experiments outside the limits of the present invention. It will be seen that the compositions of the present invention are characterized by improved thermal stability during processing. All parts and percentages are by weight, and all temperatures are in degrees Celsius unless otherwise specified. Measurements not originally in SI units have been so converted and rounded where appropriate.

In the following examples, three different polyacetals were used:

(a) "Polyacetal A" was acetate end-capped homopolymer having an approximate flow number of 5 g/10 min;

(b) "Polyacetal B" was acetate end-capped homopolymer having an approximate flow number of 9 g/10 min; and (c) "Polyacetal C" was polyoxymethylene copolymer containing approximately 2 weight percent ethylene oxide, compounded with small quantities of a polyamide, cyanoguanidine, 2,2'-methylene-bis-(6-tert-butyl-4-methyl phenol), and N,N'-ethylene bis stearamide, and having an approximate melt flow number of 5 g/10 min.

Flow numbers were determined according to ASTM D-1238, Procedure A, Condition 200/5.0 with a 1.0 mm (0.0413 inch) diameter orifice.

In the following examples, two different glass fibers were used:

(a) "Glass A" was a ⅛" long chopped strand E-glass fiber having an average fiber diameter of 13 microns. This glass also contained a coating comprising a polyurethane which consists of the reaction products of 1,6-hexane diisocyanate, 1,4-butanediol, poly(butylene adipate) and poly(ethylene glycol). The coating also contained minor amounts of aliphatic hydrocarbons, silanes and ethylene glycol diglycidyl ether. The coating comprised approximately 0.7 percent by weight of the glass; and (b) "Glass B" was the same as glass A except the average fiber diameter was 10 microns.

In the following examples, four different antioxidants were used:

(a) "Antioxidant A" was triethylene glycol-bis-3-(3-tert-butyl-4-hydroxy-5-methylphenyl) propionate;

(b) "Antioxidant B" was tetrakis(methylene (3,5-di-tert-butyl-4-hydroxy-hydrocinnamate) methane;

(c) "Antioxidant C" was 4,4'-bis(α,α-dimethylbenzyl)diphenylamine); and (d) "Antioxidant D" was N,N'-hexamethylene-bis-(3,5-di-tert-butyl-4-hydroxy-hydrocinnamide).

In the following examples, six different epoxy containing compounds were used;

(a) "Epoxide A" was an epoxy phenol novolac resin of the formula

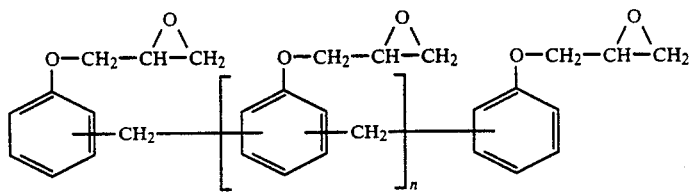

where the average value of n is approximately 3.5. The epoxy equivalent weight is 165-195 g/g mole epoxy.

(b) "Epoxide B" was 7-oxabicyclo[4.1.0] heptane-3-carboxylic acid, 7-oxabicyclo[4.1.0] hept-3-ylmethyl ester, polymer with hexahydro-1,3-isobenzofurandione. The epoxy equivalent weight is 370-425 g/g mole epoxy.

(c) "Epoxide C" was an epoxy cresol novolac resin of the formula

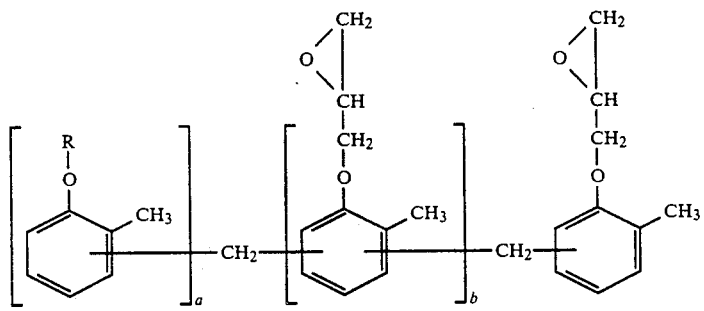

where a is approximately 1.6, b is approximately 4.4 and the epoxy equivalent weight is approximately 235 g/g mole epoxy.

(d) "Epoxide D" was a diglycidyl ether of bisphenol A of the formula

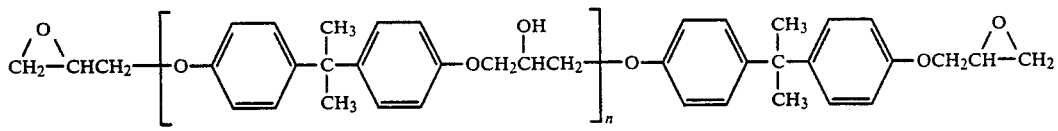

where n is approximately 3.5, and the epoxy equivalent weight is approximately 600-700 g/g mole epoxy.

(e) "Epoxide E" was 3,4-epoxycyclohexylmethyl-3,4-epoxycyclohexane carboxylate

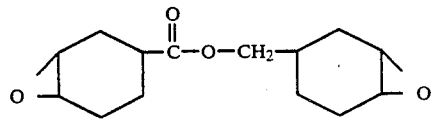

The epoxy equivalent weight is approximately 131-143 g/g mole epoxy.

(f) "Epoxide F" was a diglycidyl ether of poly(oxypropylene)glycol of the formula

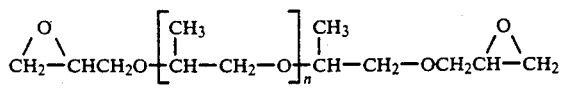

where n is approximately 9, and the epoxy equivalent weight is approximately 305-335 g/g mole epoxy.

In the following examples, four other stabilizers were used:

(a) "Stabilizer A" was a terpolymer of nylon 6/6, nylon 6/10 and nylon 6 in the approximate weight ratio of 34/23/43, and having a relative viscosity of about 70-90;

(b) "Stabilizer B" was a copolymer of ethylene and vinyl alcohol in the approximate weight ratio of 79/21;

(c) "Stabilizer C" was an amide oligomer consisting of 85 weight percent nylon 6/12 and 15 weight percent nylon 6, and having a number average molecular weight of 5900; and (d) "Stabilizer D" was an amorphous polyamide made from hexamethylenediamine, isophthalic acid and terephthalic acid, and having a glass transition temperature of approximately 130° C.

In the preparation and extrusion of compositions (or blends), the above-identified ingredients were dry blended and then compounded on a 2 inch Sterling single screw extruder at a melt temperature of 190°-220° C.

In the following examples, thermal stability of the compositions was determined using a thermally evolved formaldehyde (TEF) test procedure. The resin to be tested was dried in a moisture teller at 194° C. for 20 minutes and then placed in a desiccator. Two grams of the resin were weighed out and placed in a tube 5½" long×1" diameter containing inlet and outlet ports. Nitrogen was passed over the sample through these ports at a flow rate of approximately 250 ml/min; thus the sample is maintained in an oxygen-free environment. The sample was heated at 259° C. in a regulated oil bath. The nitrogen and any evolved gases transported thereby were bubbled through a 40 g/l sodium sulfite in water solution adjusted to pH 9.40. Any evolved formaldehyde reacts with the sodium sulfite to liberate sodium hydroxide. The sodium hydroxide was continuously neutralized with standard 0.1 N HCl delivered by an automatic titrator programmed to maintain constant pH. The titrant volume vs. time was recorded and quantitatively related to percent evolved formaldehyde by the following formula $$(V)(N)\left[\frac{0.03 \times 100}{SW}\right]$$

where
V is the volume of titer in milliliters
N is the normality of the titer, and
SW is the sample weight in grams.
The factor "0.03" is the milliequivalent weight of formaldehyde in g/milliequivalent.

Thermal evolved formaldehyde results are conveniently reported for fifteen ($TEF_{15}$) and thirty ($TEF_{30}$) minutes heating.

Tensile strength and elongation of the various compositions were measured on test specimens molded in a 6 oz. Van Dorn reciprocating screw injection molding machine. The compositions were melted at 195° C. in the melting section of the molding machine and injected under pressure into molds maintained at a temperature of 90° C. The tensile bars thus molded measured 3.175 mm thick, 12.7 mm wide in the necked down portion and were nominally 21.27 cm long. Tensile strength and elongation were measured using ASTM D-638 procedures. The bars were aged for a minimum of 7 days and conditioned at 23° C., 50% RH for a minimum of 2 days prior to testing.

EXAMPLE 1

Polyacetal A was dry blended and compounded with 25 wt % Glass B, 0.1 wt % Antioxidant A, and various other additives as indicated in Table 1. Thermal stability was determined by the TEF method on pellets of these compositions, and the pellets were injection molded into bars to use in measuring tensile strength and elongation.

Comparing Example 1a with Comparison Example 1b, shows that adding 0.2 wt % Epoxide A improves the TEF stability by almost a factor of 2 without reducing tensile strength. By contrast, Stabilizer A and Stabilizer B, which are both known to be effective stabilizers for polyacetal compositions without glass, do not improve stability in the presence of Glass A (Comparison Examples 1b, 1c and 1d).

TABLE 1

| Example | Composition (wt %) | | TEF at 15 min | TEF at 30 min | Tensile Strength ($Kg/cm^2$) | Elongation (%) |
|---|---|---|---|---|---|---|
| | Stabilizer | Epoxide | | | | |
| 1a | 1.0 B | 0.2 A | 0.46 | 1.33 | 1200 | 2.3 |
| 1b (Comparison) | 1.0 B | — | 0.42 | 2.45 | 1140 | 2.4 |
| 1c (Comparison) | 1.0 A | — | 0.37 | 2.65 | 1310 | 2.7 |
| 1d (Comparison) | — | — | 0.65 | 2.55 | 1390 | 2.8 |

All compositions are based on Polyacetal A and contain 25 wt % Glass B and 0.1 wt % Antioxidant A.

EXAMPLE 2

Polyacetal A was dry blended with 25 wt% Glass B, 0.1 wt % Antioxidant A and various other additives as indicated in Table 2. These were processed and tested in the same way as the compositions of Example 1.

Comparing Example 2a with Example 2e shows that adding only 0.1 wt % Epoxide A to the blend of Polyacetal A, 25 wt % Glass B, and 0.1 wt % Antioxidant A dramatically improves thermal stability without reducing tensile strength. Examples 2b and 2c and Comparison Example 2d show that 0.1 or 0.5 wt % Epoxide A produces about the same improvement in thermal stability, but the higher level of Epoxide A produces some reduction in tensile strength.

TABLE 2

| Example | Composition (wt %) Stabilizer | Composition (wt %) Epoxide | TEF at 15 min | TEF at 30 min | Tensile Strength (Kg/cm$^2$) | Elongation (%) |
| --- | --- | --- | --- | --- | --- | --- |
| 2a | — | 0.1 A | 0.17 | 1.01 | 1300 | 2.6 |
| 2b | 0.5 B | 0.1 A | 0.27 | 1.03 | 1290 | 2.7 |
| 2c | 0.5 B | 0.5 A | 0.41 | 1.08 | 990 | 1.8 |
| 2d (Comparison) | 0.5 B | — | 0.59 | 2.72 | 1290 | 2.8 |
| 2e (Comparison) | — | — | 0.58 | 2.28 | 1310 | 2.9 |

All compositions are based on Polyacetal A and contain 25 wt % Glass B and 0.1 wt % Antioxidant A.

EXAMPLE 3

Compositions were prepared as above containing either Polyacetal A or B, different levels of Glass A or B, different antioxidants or no antioxidant, and either Epoxide A or B. Composition and thermal stability and tensile properties are given in Table 3.

In each case, the combination of polyacetal, glass, and epoxide had good thermal stability and high tensile strength (compare with Comparison Example 3m).

EXAMPLE 5

Compositions were prepared as above using different epoxides, where the quantity of each epoxide is chosen so that each composition has approximately an equivalent amount of epoxide functionality. Composition, thermal stability and physical properties are given in Table 5.

All the compositions have improved thermal stability, but some begin to show sacrifice in physical proper-

TABLE 3

| Example | Poly-acetal | Glass | Anti-oxidant | Epoxide | TEF at 15 min | TEF at 30 min | Tensile Strength (Kg/cm$^2$) | Elongation (%) |
| --- | --- | --- | --- | --- | --- | --- | --- | --- |
| 3a | 74.8 B | 25 A | 0.1 A | 0.1 A | 0.24 | 0.97 | 1200 | 2.3 |
| 3b | 74.8 B | 25 B | 0.1 A | 0.1 A | 0.24 | 1.02 | 1280 | 2.5 |
| 3c | 74.8 A | 25 A | 0.1 A | 0.1 A | 0.17 | 0.87 | 1240 | 2.7 |
| 3d | 74.8 A | 25 B | 0.1 A | 0.1 A | 0.20 | 0.90 | 1320 | 2.8 |
| 3e | 89.8 B | 10 A | 0.1 A | 0.1 A | 0.23 | 1.09 | 900 | 3.4 |
| 3f | 59.8 B | 40 A | 0.1 A | 0.1 A | 0.34 | 1.37 | 1290 | 1.8 |
| 3g | 74.85 B | 25 A | 0.1 A | 0.05 A | 0.28 | 1.34 | 1210 | 2.5 |
| 3h | 74.7 B | 25 A | 0.1 A | 0.2 A | 0.27 | 1.11 | 1170 | 2.2 |
| 3i | 74.8 B | 25 A | 0.1 B | 0.1 A | 0.22 | 1.12 | 1190 | 2.3 |
| 3j | 74.8 B | 25 A | 0.1 C | 0.1 A | 0.19 | 1.00 | 1230 | 2.4 |
| 3k | 74.9 B | 25 A | — | 0.1 A | 0.20 | 0.99 | 1230 | 2.3 |
| 3l | 74.8 B | 25 A | 0.1 A | 0.1 B | 0.37 | 1.78 | 1140 | 1.8 |
| 3m (Comparison) | 75 B | 25 A | — | — | 0.72 | 2.64 | 1180 | 2.4 | ties as compared with the most preferred epoxide.

TABLE 5

| Example | Poly-acetal | Glass | Anti-oxidant | Epoxide | TEF at 15 min | TEF at 30 min | Tensile Strength (Kg/cm$^2$) | Elongation (%) |
| --- | --- | --- | --- | --- | --- | --- | --- | --- |
| 5a | 74.62 B | 25 A | 0.1 A | 0.28 C | 0.32 | 1.32 | 970 | 1.7 |
| 5b | 74.17 B | 25 A | 0.1 A | 0.73 D | 0.43 | 1.66 | 840 | 1.5 |
| 5c | 74.45 B | 25 A | 0.1 A | 0.45 B | 0.39 | 1.80 | 790 | 1.4 |
| 5d | 74.74 B | 25 A | 0.1 A | 0.16 E | 0.56 | 2.22 | 1150 | 2.2 |
| 5e | 74.53 B | 25 A | 0.1 A | 0.37 F | 0.63 | 2.70 | 1080 | 2.1 |
| 4a (Comparison) | 74.9 B | 25 A | 0.1 A | — | 1.11 | 4.02 | 1310 | 2.7 |

EXAMPLE 4

Compositions were prepared as above using different quantities of Epoxide A. Composition, thermal stability and physical properties are given in Table 4.

Good thermal stability is achieved with 0.1 weight percent Epoxide A. Greater quantities of Epoxide A do not significantly further improve thermal stability, and such compositions begin to show a drop off in physical properties.

EXAMPLE 6

Compositions were prepared as above using different antioxidants and non-epoxy stabilizers in combination with Epoxide A. Composition, thermal stability and physical properties are given in Table 6.

All the compositions are quite good in stability and physical properties.

TABLE 4

| Example | Poly-acetal | Glass | Anti-oxidant | Epoxide | TEF at 15 min | TEF at 30 min | Tensile Strength (Kg/cm$^2$) | Elongation (%) |
| --- | --- | --- | --- | --- | --- | --- | --- | --- |
| 4a (Comparison) | 74.9 B | 25 A | 0.1 A | — | 1.11 | 4.02 | 1310 | 2.7 |
| 4b | 74.8 B | 25 A | 0.1 A | 0.1 A | 0.38 | 1.69 | 1190 | 2.3 |
| 4c | 74.7 B | 25 A | 0.1 A | 0.2 A | 0.35 | 1.39 | 1110 | 2.0 |
| 4d | 74.4 B | 25 A | 0.1 A | 0.5 A | 0.36 | 1.24 | 910 | 1.6 |

TABLE 6

| Example | Poly-acetal | Glass | Anti-oxidant | Epoxide | Stabilizer | TEF at 15 min | TEF at 30 min | Tensile Strength (Kg/cm$^2$) | Elongation (%) |
| --- | --- | --- | --- | --- | --- | --- | --- | --- | --- |
| 6a | 74.3 B | 25 A | 0.5 A | 0.2 A | — | 0.37 | 1.42 | 1090 | 1.9 |
| 6b | 74.3 B | 25 A | 0.5 D | 0.2 A | — | 0.35 | 1.48 | 1090 | 2.0 |
| 6c | 74.3 B | 25 A | 0.5 C | 0.2 A | — | 0.31 | 1.34 | 1090 | 2.0 |
| 6d | 73.7 B | 25 A | 0.1 A | 0.2 A | 1.0 C | 0.41 | 1.41 | 1050 | 1.9 |
| 6e | 73.7 B | 25 A | 0.1 A | 0.2 A | 1.0 D | 0.34 | 1.28 | 1120 | 2.0 |
| 4a (Comparison) | 74.9 B | 25 A | 0.1 A | — | — | 1.11 | 4.02 | 1310 | 2.7 |

EXAMPLE 7

Compositions were prepared as above using an equal weight percent of different epoxides. Composition, thermal stability and physical properties are given in Table 7.

All the compositions are improved in stability; however, it can be seen that Epoxide A is more effective than Epoxide F, which is more effective than Epoxide D.

TABLE 7

| Example | Poly-acetal | Glass | Anti-oxidant | Epoxide | TEF at 15 min | TEF at 30 min | Tensile Strength (Kg/cm$^2$) | Elongation (%) |
| --- | --- | --- | --- | --- | --- | --- | --- | --- |
| 7a | 74.8 B | 25 B | 0.1 A | 0.1 A | 0.33 | 1.35 | 1310 | 2.5 |
| 7b | 74.8 B | 25 B | 0.1 A | 0.1 D | 0.87 | 2.88 | 1180 | 2.2 |
| 7c | 74.8 B | 25 B | 0.1 A | 0.1 F | 0.58 | 2.28 | 1230 | 2.4 |

EXAMPLE 8

Compositions were prepared as above using Polyacetal C. Composition, thermal stability and physical properties are given in Table 8.

A significant improvement in thermal stability results from inclusion of Epoxide A with no significant change in physical properties.

TABLE 8

| Example | Poly-acetal | Glass | Epoxide | TEF at 15 min | TEF at 30 min | Tensile Strength (Kg/cm$^2$) | Elongation (%) |
| --- | --- | --- | --- | --- | --- | --- | --- |
| 8a | 75 C | 25 B | — | 0.39 | 1.23 | 1060 | 2.3 |
| 8b | 74.8 C | 25 B | 0.2 A | 0.06 | 0.24 | 1160 | 2.3 |

COMPARISON EXAMPLE 9

Effect of Epoxide on Thermal Stability of Polyacetal without Glass

Compositions of Polyacetal A with and without 0.5 wt% Epoxide A were dry blended and compounded on a 28 mm Werner & Pfleiderer twin-screw extruder. TEF thermal stabilities of these compositions were determined. Comparison Example 9a with 0.5 wt % Epoxide A had TEF at 15 min of 1.06 and TEF at 30 min of 3.03. Comparison Example 9b without 0.05 wt % Epoxide A (Polyacetal A alone) had TEF at 15 min of 1.82 and TEF at 30 min of 3.45. Thus, in the absence of glass, the epoxide has only a small effect on thermal stability.

I claim:

1. A thermoplastic glass reinforced polyacetal composition consisting essentially of
   (a) 0.02–1.0 weight percent of at least one epoxy containing compound,
   (b) 5–50 weight percent of glass fiber containing a coating comprising at least one polyurethane, and
   (c) 49–94.98 weight percent of at least one polyacetal polymer,
   the above-stated percentages being based on the total amount of components (a), (b) and (c) only.

2. The composition of claim 1 wherein the quantity of component (a) is 0.05–0.2 weight percent.

3. The composition of claim 1 wherein the quantity of component (b) is 15–40 weight percent.

4. The composition of claim 1 wherein the epoxy containing compound is selected from epoxy phenol novolac resins; 7-oxabicyclo[4.1.0]heptane-3-carboxylic acid, 7-oxabicyclo[4.1.0]hept-3-ylmethyl ester, polymer with hexahydro-1,3-isobenzofurandione; epoxy cresol novolac resins; diglycidyl ethers of bisphenol A; 3,4-epoxycyclohexylmethyl-3,4-epoxycyclohexane carboxylate; or diglycidyl ethers of poly(oxypropylene)glycol.

5. The composition of claim 4 wherein the epoxy containing compound is selected from epoxy phenol novolac resins, epoxy cresol novolac resins, or 7-oxabicyclo[4.1.0]heptane-3-carboxylic acid, 7-oxabicyclo[4.1.0]hept-3-ylmethyl ester, polymer with hexahydro-1,3-isobenzofurandione.

6. The composition of claim 5 wherein the epoxy containing compound is selected from epoxy phenol novolac resins.

7. The composition of claim 6 wherein the epoxy containing compound is an epoxy phenol novolac resin of the formula

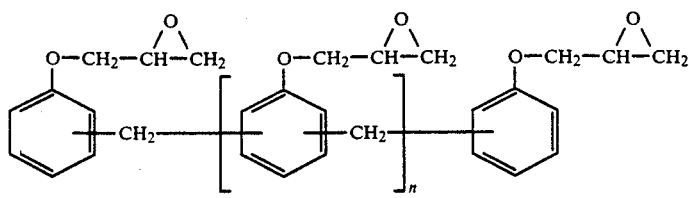

where the average value of n is approximately 3.5.

8. The composition of claim 1 wherein the coating on the glass fiber comprises at least one polyurethane which consists essentially of the reaction products of at least one aliphatic diisocyanate and at least one aliphatic diol.

9. The composition of claim 8 wherein the coating on the glass fiber comprises at least one polyurethane which consists essentially of the reaction products of 1,6-hexane diisocyanate, 1,4-butanediol, poly(butylene adipate) and poly(ethylene glycol).

10. The composition of claim 9 wherein the coating further comprises minor amounts of at least one of aliphatic hydrocarbons, silanes or ethylene glycol diglycidyl ether.

11. The composition of claim 1 wherein the polyacetal is homopolymer.

12. The composition of claim 1 wherein the polyacetal is copolymer.

13. Shaped articles made from the composition of claim 1.